United States Patent
Fan et al.

(10) Patent No.: US 10,390,269 B2
(45) Date of Patent: Aug. 20, 2019

(54) UPLINK MEASUREMENT BASED MOBILITY MANAGEMENT

(71) Applicant: Telefonaktiebolaget LM Ericsson (publ), Stockholm (SE)

(72) Inventors: Rui Fan, Beijing (CN); Andres Reial, Malmö (SE); Claes Tidestav, Bålsta (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 152 days.

(21) Appl. No.: 15/515,685

(22) PCT Filed: Aug. 19, 2016

(86) PCT No.: PCT/CN2016/095937
§ 371 (c)(1),
(2) Date: Mar. 30, 2017

(87) PCT Pub. No.: WO2018/032483
PCT Pub. Date: Feb. 22, 2018

(65) Prior Publication Data
US 2018/0332511 A1 Nov. 15, 2018

(51) Int. Cl.
*H04W 4/00* (2018.01)
*H04W 36/00* (2009.01)

(52) U.S. Cl.
CPC .............. *H04W 36/0094* (2013.01)

(58) Field of Classification Search
CPC ......... H04W 36/0005; H04W 36/0011; H04W 36/0016; H04W 36/0083;
(Continued)

(56) References Cited

U.S. PATENT DOCUMENTS

| 9,426,707 | B1* | 8/2016 | Sitaram ............. H04W 36/0058 |
| 9,693,281 | B2* | 6/2017 | Chockalingam ...... H04W 36/30 |
| 2013/0102341 | A1 | 4/2013 | Alapuranen et al. |

FOREIGN PATENT DOCUMENTS

| CN | 102006627 A | 4/2011 |
| CN | 102790996 A | 11/2012 |

(Continued)

OTHER PUBLICATIONS

PCT Notification of Transmittal of the International Search Report and the Written Opinion of the International Searching Auithority, or the Declaration for International application No. PCT/CN2016/095937—dated Apr. 27, 2017.

*Primary Examiner* — Frank Duong
(74) *Attorney, Agent, or Firm* — Baker Botts, LLP

(57) ABSTRACT

The embodiments disclose a method in an access node of a wireless network. The method comprises a step of performing a first uplink signal quality measurement, a step of receiving a first downlink signal quality, a step of determining a downlink signal quality mapping function based on a first uplink signal quality in the first uplink signal quality measurement and the first downlink signal quality, a step of performing a second uplink signal quality measurement and a step of deriving a second downlink signal quality based on the downlink signal quality mapping function and a second uplink signal quality in the second uplink signal quality measurement. According to one or more aspects of the disclosure, there are also provided corresponding access nodes.

18 Claims, 7 Drawing Sheets

(58) Field of Classification Search
CPC ..... H04W 36/00835; H04W 36/00837; H04W 36/0085; H04W 36/0094; H04W 36/08; H04W 36/14; H04W 36/18; H04W 80/04; H04W 84/12; H04W 84/18; H04W 88/06; H04W 88/08
See application file for complete search history.

(56) References Cited

FOREIGN PATENT DOCUMENTS

| | | |
|---|---|---|
| CN | 104412655 A | 3/2015 |
| WO | WO 2015 120876 | 8/2015 |

\* cited by examiner downlink measurement based handover procedure

UPLINK MEASUREMENT BASED MOBILITY MANAGEMENT

PRIORITY

This nonprovisional application is a U.S. National Stage Filing under 35 U.S.C. § 371 of International Patent Application Serial No. PCT/CN2016/095937 filed Aug. 19, 2016, and entitled "Uplink Measurement Based Mobility Management."

TECHNICAL FIELD

The present disclosure generally relates to methods for performing mobility management procedure based on an uplink signal quality measurement in a wireless network and access nodes thereof.

BACKGROUND

A handover is a process of transferring an ongoing wireless connection of a wireless device from a serving access node to a target access node to provide a transparent service for mobile users. Handover is important in a wireless network for mobility management function.

Generally, a handover procedure is based on a downlink signal quality measurement, which is schematically shown in FIG. 1. It is illustrated that an access node is serving for a wireless device in a wireless network. In order to make a handover decision, the access node transmits the wireless device a downlink measurement control signaling, from which the wireless device could obtain downlink signal quality measurement control parameters, such as a carrier frequency, a measurement bandwidth, measurement object, and measurement reporting configuration. According to configuration of downlink measurement control signaling, the wireless device performs a downlink signal quality measurement for a plurality of access nodes, and then transmits a downlink signal quality report to the access node serving for the wireless device. Then, the serving access node makes a handover decision according to the downlink signal quality report and transmits a handover command to the wireless device. In multiple antenna cellular systems, a plurality of beams will be exploited to improve signal quality, while continuously transmitting downlink reference signals in all these beams is not desirable, since it will generate a lot of interference and increase energy consumption for the access node. Moreover, in the downlink measurement based handover procedure for multiple beam communication system, a wireless device has to measure a plurality of downlink reference signals in a plurality of beams and then it needs to report all these measurement results to a serving access node, which takes more time to perform a handover procedure. Therefore, the downlink measurement based handover procedure is less desirable especially in multiple beam communication systems.

SUMMARY

It is an object of the present disclosure to resolve or alleviate at least one of the problems as mentioned above. In this disclosure, an uplink measurement based handover procedure is presented. In the uplink measurement based handover procedure, the handover decision is made by an access node according to derived downlink signal qualities, which are determined according to uplink signal qualities in the uplink measurement and downlink signal quality mapping functions. More specifically, the uplink measurement based handover procedure could be divided into two phases. In a first phase, an access node will determine a downlink signal quality mapping function based on at least a first uplink signal quality in a first uplink signal quality measurement and at least a first downlink signal quality received from a wireless device. In a second phase, the access node performs a second uplink signal quality measurement, based on which a second downlink signal quality could be derived by the access node using the downlink signal quality mapping function.

For example, according to the derived downlink signal quality, a handover decision could be made, thus performing a handover procedure. In the uplink measurement based handover procedure, a wireless device will only need to perform a downlink signal quality measurement and transmit the access node a downlink signal quality in the first phase, which reduces time and energy consumption for the wireless device. Furthermore, a downlink signal quality used in handover decision making is derived according to a downlink signal quality mapping function, leading to accurate downlink signal quality estimation.

According to one aspect of the disclosure, there is provided a method in an access node of a wireless network. The method comprises a step of performing a first uplink signal quality measurement, a step of receiving a first downlink signal quality, a step of determining a downlink signal quality mapping function based on a first uplink signal quality in the first uplink signal quality measurement and the first downlink signal quality, a step of performing a second uplink signal quality measurement and a step of deriving a second downlink signal quality based on the downlink signal quality mapping function and a second uplink signal quality in the second uplink signal quality measurement.

According to another aspect of the disclosure, there is provided another method in an access node of a wireless network. The method further comprises a step of performing a third uplink signal quality measurement, a step of receiving a third downlink signal quality and a step of determining the downlink signal quality mapping function based on the first and a third uplink signal qualities and the first and the third downlink signal qualities.

According to another aspect of the disclosure, there is provided another method in an access node of a wireless network, the access node serving for a wireless device. The method further comprises a step of receiving a downlink signal quality from each of one or more neighboring access nodes of the access node, the received downlink signal quality of each of one or more neighboring access node being derived at the each of one or more neighboring access nodes, a step of making a mobility management decision, based on the received downlink signal qualities and the second downlink signal quality and a step of performing a mobility management action based on the mobility management decision.

According to another aspect of the disclosure, there is provided another method in an access node of a wireless network, the access node serving for a wireless device. The method further comprises a step of receiving an uplink signal quality from each of one or more neighboring access nodes, a step of deriving a downlink signal quality based on the received uplink signal quality and a downlink signal quality mapping function for the each of the one or more neighboring access nodes, a step of making a mobility management decision, based on the derived downlink signal qualities and the second downlink signal quality and a step of performing a mobility management action based on the mobility management decision.

According to another aspect of the disclosure, there is provided an access node in a wireless network. The access node comprises a memory storing instructions therein and a processing system configured to execute the instructions performing the steps of the method as presented above.

According to another aspect of the disclosure, there is provided a computer readable storage medium, which store instructions which, when run on a processing system of an access node for a wireless network, cause the access node to perform the steps of the method according to method as presented above.

BRIEF DESCRIPTION OF THE DRAWINGS

Exemplary features of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF EMBODIMENTS

Figure 1:
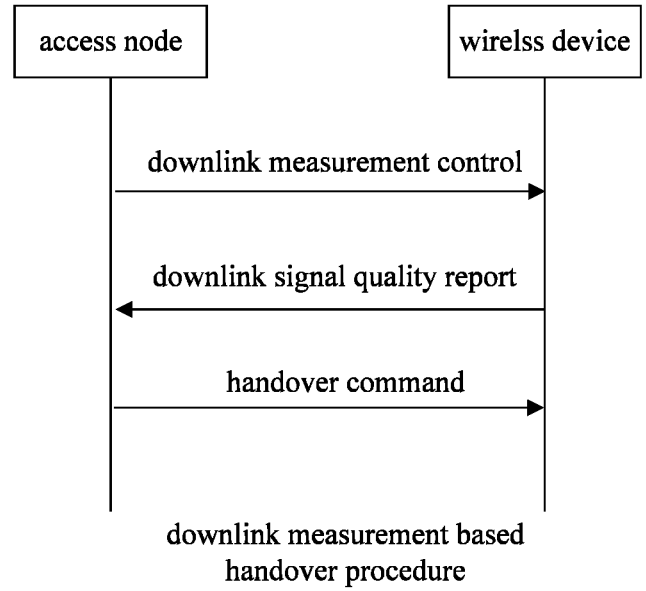
FIG. 1 schematically illustrates an exemplary flow diagram for downlink measurement based handover procedure in a wireless network.

Embodiments herein will be described in detail hereinafter with reference to the accompanying drawings, in which embodiments are shown.

These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present disclosure is described below with reference to block diagrams and/or flowchart illustrations of methods, nodes, devices and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Figure 2:
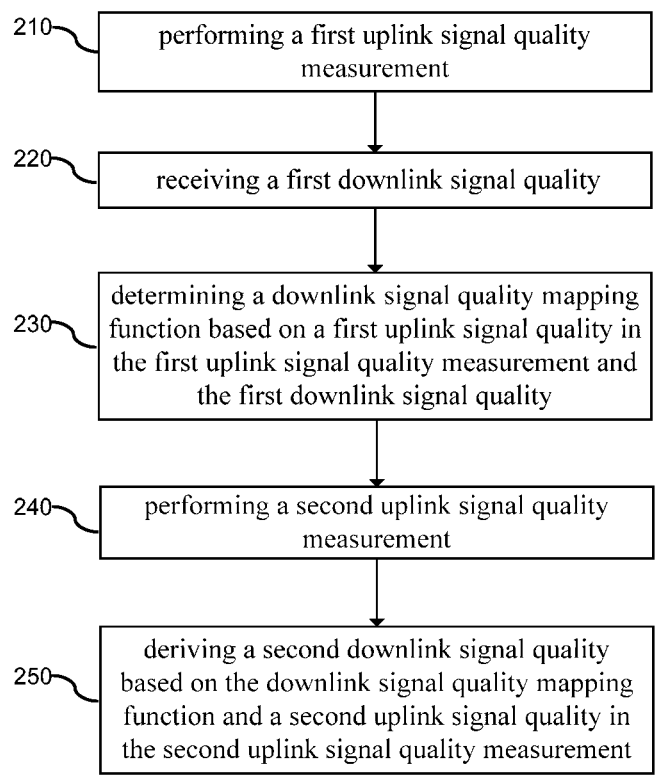
FIG. 2 shows a flowchart for illustrating a method in an access node of a wireless network for deriving a downlink signal quality according to one or more embodiments of the disclosure.

FIG. 2 shows a flowchart for illustrating a method in an access node of a wireless network for deriving a downlink signal quality according to one or more embodiments of the disclosure.

At step 210, an access node performs a first uplink signal quality measurement. In a wireless network, a wireless device transmits one or more uplink reference signals periodically to the access node, such as a Demodulation Reference Signal (DMRS), a Sounding Reference Signal (SRS), and an Uplink Synchronization Signal (USS), based on which the access node measures the uplink signal quality.

At step 220, the access node receives a first downlink signal quality from the wireless device. In the wireless network, the access node transmits one or more downlink reference signals periodically, to wireless devices in coverage of the access node, such as Mobility Reference Signal (MRS), Channel State Information-Reference Signal (CSI-RS), Cell-specific Reference Signal (CRS), Primary Synchronization Signal (PSS), and Secondary Synchronization Signal (SSS). The first downlink signal quality is measured by the wireless device based on the received downlink reference signal, and then the wireless device transmits the first downlink signal quality to the access node via signaling, such as a Radio Resource Control (RRC) signalling, Media Access Control (MAC) signalling (e.g. MAC control element (CE) signalling) in Long Term Evolution (LTE) systems. It should be mentioned that the uplink and downlink signal qualities could be Reference Signal Receiving Power (RSRP), Reference Signal Receiving Quality (RSRQ), Received Signal Strength Indication (RSSI), Signal to Noise Ratio (SNR), or Signal to Interference plus Noise Ratio (SINR), which can be chosen by skilled in the art according to different system configurations and application scenarios. And there is no requirement of a fixed order of step 210 and step 220, as long as a first uplink and a first downlink signal quality are ready before determining a downlink signal quality mapping function.

At step 230, the access node determines a downlink signal quality mapping function based on a first uplink signal quality in the first uplink signal quality measurement and the first downlink signal quality. It should be mentioned that the downlink signal quality mapping function could be a mathematical function, such as a linear function with respect to an uplink signal quality and a calibration offset. It could be a mapping table, based on which a downlink signal quality could be determined according to an uplink signal quality. It should be also mentioned the downlink signal quality mapping function could be determined based on different methodologies, such as mathematical interpolation and functional fitting. It is appreciated that the skilled in the art could choose a specific methodology to determine the downlink signal quality mapping function according to different system configuration and requirements. One preferable downlink signal quality mapping function is a linear function, which is characterized by a calibration offset between the uplink signal quality and the downlink signal quality.

It should be noted that the downlink signal quality mapping function could be updated periodically, or in response to one or more predefined events. For example, as discussed below, an uplink measurement based handover procedure may be performed according to a downlink signal quality derived based on the downlink signal quality mapping function, and if an event that handover success rate is lower than a threshold happens, it may be determined that the downlink signal quality mapping function is not accurate enough for the access node to derive an accurate downlink signal quality based on an uplink signal quality, therefore, the access node may update the downlink signal quality mapping function. It is desirable for the skilled in the art to define different event to trigger an updating of the downlink signal quality mapping function according to different system configurations and application requirements without departing the spirit and teaching of the disclosure.

At step 240, the access node performs a second uplink signal quality measurement. As discussed above, the step 210, 220, and 230 could be termed as a training phase, which is aimed to obtain a downlink signal quality mapping function which reflects a relationship between uplink signal quality and downlink signal quality at the access node. After the training phase, the wireless device only transmits uplink reference signals to the access node, based on which the access node performs a second uplink signal quality measurement to obtain a second uplink signal quality. The wireless device does not need to perform further downlink signal quality measurements, which will save energy consumption and processing time for the wireless derive, especially in multiple beam communication system.

It should be noted that compared with an access node, an energy conservation and processing ability of a wireless device may be relatively low, therefore it is advantageous for an uplink measurement based mobility management presented in this disclosure to save an energy consumption and processing time for the wireless device. In an uplink measurement based mobility management, a wireless device will only need to perform a downlink signal quality measurement in a training phase and it is not required to perform further downlink signal quality measurements or report measurement result to an access node in the execution phase, while in a conventional downlink measurement based mobility management, the wireless device is required to perform a downlink signal quality measurement and report a measurement result to a serving access node every time when performing a handover procedure, which is not desirable for the energy and processing ability limited wireless device, for example.

At step 250, the access node derives a second downlink signal quality based on the downlink signal quality mapping function and a second uplink signal quality obtained at step 240. It should be noted that step 240 and 250 could be also termed as an execution phase, which is mainly aimed to obtain a downlink signal quality from an uplink signal quality.

It should be mentioned that the training process in the training phase and the execution process in execution phase could be performed in parallel from another aspect. For example, the training process could be triggered to determine an updated downlink signal quality mapping function, periodically or in response to one or more predefined events. When the training process is being performed, the execution process could be performed at the same time (e.g., in parallel) based on an existing downlink signal quality mapping function. After the training process is finished, an updated downlink signal quality mapping function is determined, and then next execution process could be performed based on the updated downlink signal quality mapping function. It should be also noted that any modification, equivalent change, and/or variation could be implemented by the skilled in the art without departing the spirit of the disclosure.

It could be appreciated by the skilled in the art that the downlink signal quality mapping function could be determined based on the downlink signal quality and uplink signal quality of one wireless device, and once the downlink signal mapping function is determined at the access node, it could be used to derive the downlink signal quality for handover decision making of other wireless devices. Taking a linear downlink signal mapping function for example, after one calibration offset is determined based on a downlink signal quality of an uplink signal quality with respect to one wireless device; this calibration offset could be used to derive a downlink signal quality for other wireless devices. For another example, a plurality of calibration offsets could be determined with respect to a plurality of wireless devices, which means each wireless device served by the access node could corresponds to one calibration offset. For still another example, a plurality of calibration offsets with respect to a plurality of wireless devices could be averaged to obtain one calibration offset for all the wireless devices, which means each access node corresponds to one calibration offset for all the wireless devices served by the access node. It is desirable for the access node to exploit the derived downlink signal quality in different applications. For example, the derived downlink signal quality could be used to make a mobility management decision. For another example, if a plurality of calibration offsets is determined with respect to a plurality of wireless devices in coverage of the access node, the derived downlink signal quality for different wireless devices could be used for a downlink transmission resource scheduling and allocation between different wireless devices. It should be also noted that any modification, change, and/or variation of implementation could be appreciated by the skilled in the art without departing the spirit of the disclosure.

Figure 3:
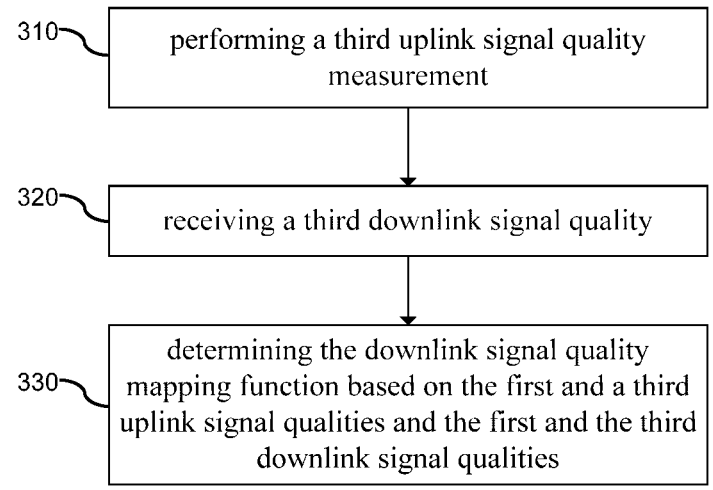
FIG. 3 shows a flowchart for illustrating another method in an access node of a wireless network with some further steps for deriving a downlink signal quality according to one or more embodiments of the disclosure.

FIG. 3 shows a flowchart for illustrating another method in an access node of a wireless network with some further steps for deriving a downlink signal quality according to one or more embodiments of the disclosure.

At step 310, the access node performs a third uplink signal quality measurement. As illustrated above, the determination of the downlink signal quality is based on the uplink signal quality in the uplink signal quality measurement of the access node and downlink signal quality in the downlink signal quality measurement of the wireless device. It is advantageous for the access node to obtain more than one uplink and downlink signal quality to determine a more accurate downlink signal quality mapping function. Therefore, the access node may perform a further uplink signal quality measurement, i.e., a third uplink signal quality measurement to obtain more uplink signal qualities for use in the determination of the downlink signal quality mapping function in the following steps.

At step 320, the access node receives a third downlink signal quality. As illustrated at step 310, the access node may instruct the wireless device to perform further downlink signal quality measurement, i.e., a third downlink signal quality measurement. After the wireless device performs a third downlink signal quality measurement, it will transmit a third downlink signal quality to the access node for determination of the downlink signal quality mapping function in following step, as discussed below.

At step 330, the access node determines the downlink signal quality mapping function based on the first and a third uplink signal qualities and the first and the third downlink signal qualities. It should be mentioned that the access node may perform a simple average operation for the first and the third uplink signal qualities and the first and the third downlink signal qualities to obtain a more accurate calibration offset for a linear downlink signal quality mapping function. It should be also mentioned that the access node may perform a mathematical interpolation for the first and the third uplink signal qualities and the first and the third downlink signal qualities to obtain a more accurate downlink signal quality mapping function.

It would be understood that the third uplink signal quality and the third downlink signal quality is an example of more than one pair of uplink and downlink signal quality contrast based on which the downlink signal quality mapping function is determined by the access node. A further fourth uplink and downlink signal qualities would be used for a more accurate downlink signal quality mapping function.

Figure 4:
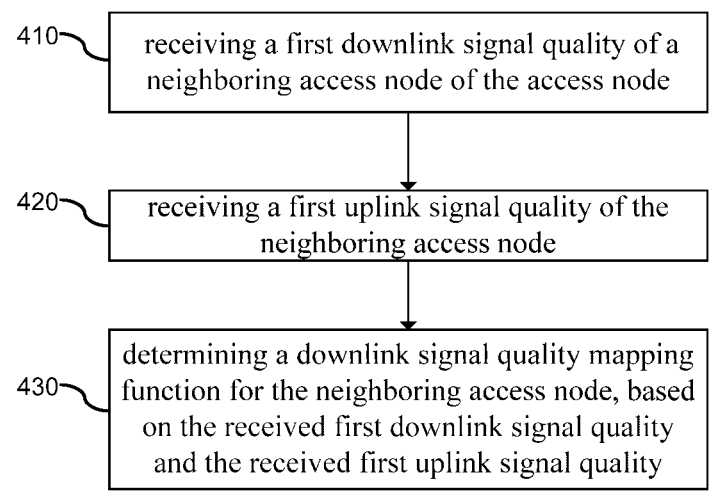
FIG. 4 shows a flowchart for illustrating another method in an access node of a wireless network for deriving a downlink signal quality according to one or more embodiments of the disclosure.

FIG. 4 shows a flowchart for illustrating another method in an access node of a wireless network for deriving a downlink signal quality according to one or more embodiments of the disclosure. It is assumed that the access node is serving for a wireless device, i.e. serving access node, and there is a plurality of neighboring access nodes of the serving access node. The downlink signal quality mapping function of a neighboring access node could be determined by the neighboring access node itself through a training phase, as illustrated above. Alternatively, the serving access node may determine a plurality of downlink signal quality mapping functions for the plurality of neighboring access nodes of the serving access node, which will be discussed below.

At step 410, an access node receives a first downlink signal quality of a neighboring access node. A wireless device served by the access node performs a first downlink signal quality measurement and thus obtains the first downlink signal quality of the neighboring access node. Then the wireless device transmits the first downlink signal quality of the neighboring access node to the access node serving the wireless device.

At step 420, the access node receives a first uplink signal quality of the neighboring access node. The neighboring access node performs a first uplink signal quality measurement and obtains the first uplink signal quality. Then the neighboring access node transmits the first uplink signal quality to the serving access node, for example through X2 interface in LTE system.

At step 430, the access node determines a downlink signal quality mapping function for the neighboring access node, based on the received first downlink signal quality and the received first uplink signal quality. It is noted that the determination of the downlink signal quality mapping function of the neighboring access node could be performed by the same methodologies as presented above.

In the present disclosure, wireless devices also known as mobile terminals, wireless terminals and/or User Equipment (UE) are enabled to communicate wirelessly with an access node in a wireless communication network, sometimes also referred to as a cellular radio system. For instance, a communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or Personal Computer (PC). The wireless device may be a portable, pocket-storable, hand-held, computer-comprised, or vehicle-mounted mobile device, enabled to communicate voice and/or data, via a wireless or wired connection.

Typically, an access node may serve or cover one or several cells of the wireless communication system. That is, the access node provides radio coverage in the cell(s) and communicates over an air interface with wireless devices operating on radio frequencies within its range. The access node in some wireless communication systems may be also referred to as "eNB", "eNodeB", "NodeB" or "B node" for example, depending on the technology and terminology used. In the present disclosure, the access node may also be referred to as a Base Station (BS). The access node may be of different classes such as e.g. macro eNodeB, home eNodeB or pico base station, or relay node in heterogeneous or homogeneous networks, based on transmission power and thereby also cell size.

Figure 5:
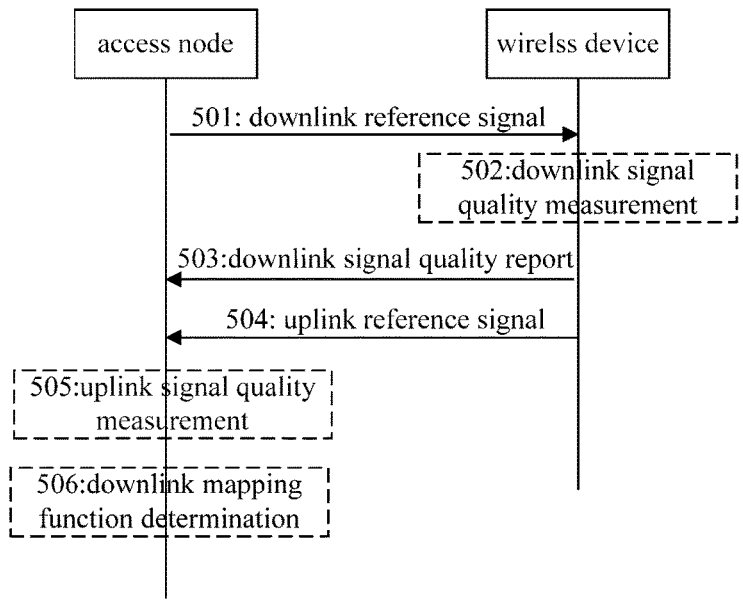
FIG. 5 schematically illustrates an exemplary flow diagram for showing a method of an access node and a wireless device within the coverage of the access node of a wireless network for determining a downlink signal quality mapping function according to one or more embodiments of the disclosure.

FIG. 5 schematically illustrates an exemplary flow diagram for showing a method of an access node and a wireless device within the coverage of the access node of a wireless network for determining a downlink signal quality mapping function according to one or more embodiments of the disclosure. In FIG. 5, the downlink signal quality mapping function of an access node is determined by this access node itself.

At step 501, an access node transmits a downlink reference signal to wireless devices in coverage of the access node. The downlink reference signal could be MRS, CSI-RS, CRS, PSS, or SSS. A wireless device that receives the downlink reference signal performs a downlink signal quality measurement at step 502 in order to obtain a downlink signal quality. At step 503, the wireless device sends the downlink signal quality to the access node via a downlink signal quality report. At step 504, the wireless device transmits an uplink reference signal to the access node, which could be USS, SRS, or DMRS. The access node receives the uplink reference signal and performs an uplink signal quality measurement at step 505 to obtain an uplink signal quality. At step 506, the access node determines a downlink signal quality mapping function. The access node illustrated in FIG. 5 would be serving node of the wireless device, or one of neighboring nodes of the serving node.

It should be noted that for purposes of simplicity of explanation, the one or more methods shown herein, for example, in the form of a flow chart or flow diagram, are shown and described as a series of steps, it is to be understood and appreciated that the methods are not limited by the order of steps, as some steps may, in accordance therewith, occur in a different order and/or concurrently with other acts from that shown and described herein. For example, the step 501 of access node transmitting a downlink reference signal and step 504 of wireless device transmitting an uplink reference signal could occur in different orders or at the same time. Furthermore, the step 502 of wireless performing a downlink signal quality measurement and step 505 of access node performing an uplink signal quality measurement could also occur in different orders or at the same time. It should be also noted that any modification, equivalent change, and/or variation could be implemented by the skilled in the art without departing the spirit and teaching of this disclosure.

Figure 6:
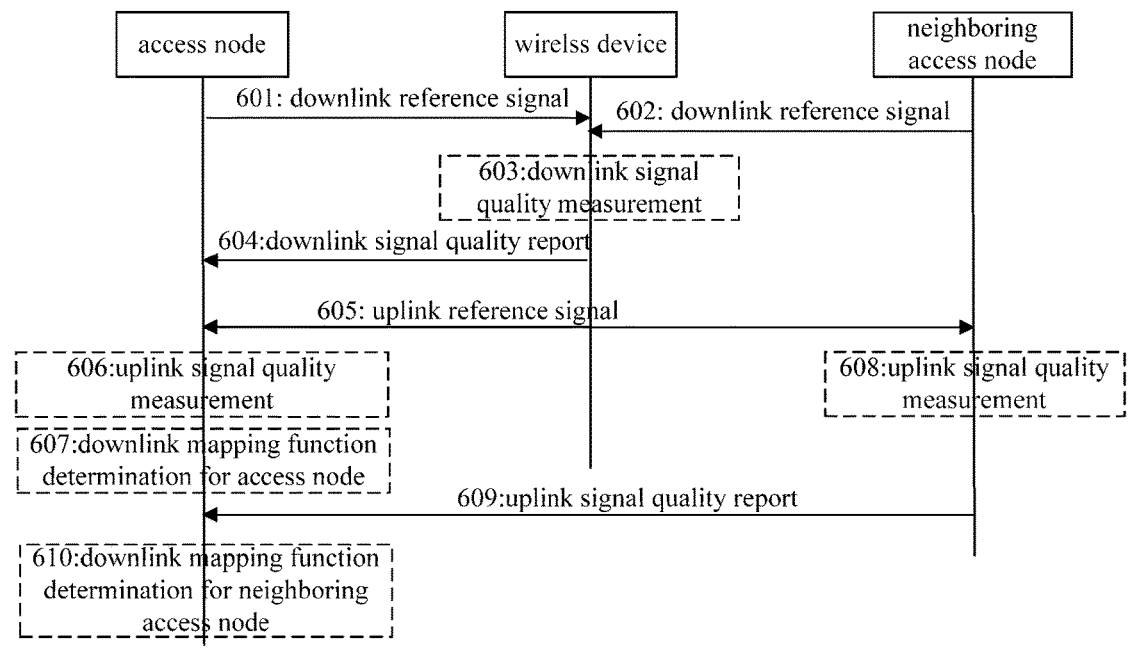
FIG. 6 schematically illustrates an exemplary flow diagram for showing another method of an access node, its neighboring access node(s) and a wireless device served by the access node of a wireless network for determining downlink signal quality mapping functions according to one or Hi more embodiments of the disclosure.

FIG. 6 schematically illustrates an exemplary flow diagram for showing another method of an access node, its neighboring access node(s) and a wireless device served by the access node of a wireless network for determining downlink signal quality mapping functions according to one or more embodiments of the disclosure. In FIG. 6, the access node serving for a wireless device determines a downlink signal quality mapping function for itself, and the access node also determines a downlink signal quality mapping function for its neighbouring access nodes.

At step 601, the access node, which is serving for a wireless device, transmits a downlink reference signal to the wireless device and at step 602, the neighbouring access node transmits its downlink reference signal to the wireless device. After the wireless device receives the downlink reference signals, it performs a downlink signal quality measurement for the access node and the neighbouring access node to obtain downlink signal qualities of the access node and the neighbouring access node at step 603. At step 604, the wireless device transmits the downlink signal qualities to the access node in a downlink signal quality report. It should be noted that the wireless device may transmit the downlink signal quality for the serving access node and the downlink signal quality for the neighbouring access node together in one measurement report, and alternatively, the two downlink signal qualities could also be transmitted to the serving access node separately in different measurement reports. At step 605, the wireless device transmits an uplink reference signal to the access node and its neighbouring access node. At step 606, the access node performs an uplink signal quality measurement based on the received uplink reference signal from the wireless device to obtain an uplink signal quality for the access node. Then the access node determines a downlink signal quality mapping function for the access node based on the downlink and uplink signal qualities of the access node at step 607. At step 608, the neighbouring access node performs an uplink signal quality measurement based on the received uplink reference signal from the wireless device to obtain an uplink signal quality for the neighbouring access node, which is transmitted to the access node in an uplink signal quality report by the neighbouring access node at step 609. Then at step 610, the access node determines a downlink signal quality mapping function for the neighbouring access node based on the downlink and uplink signal qualities of the neighbouring access node. It should be also noted that for purposes of simplicity, the one or more methods shown herein, for example, in the form of a flow chart or flow diagram, are shown and described as a series of steps, it is to be understood and appreciated that the methods are not limited by the order of steps, as some steps may, in accordance therewith, occur in a different order and/or concurrently with other acts from that shown and described herein.

Figure 7:
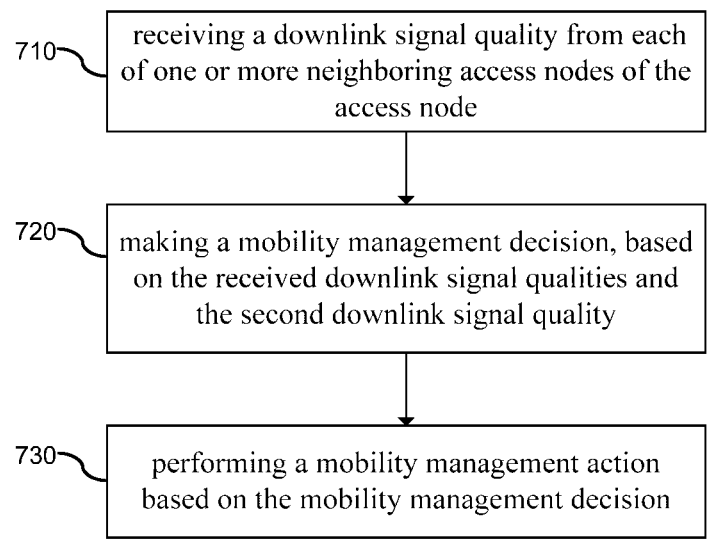
FIG. 7 shows a flowchart for illustrating a method in an access node of a wireless network for performing a mobility management procedure according to one or more embodiments of the disclosure.

FIG. 7 shows a flowchart for illustrating a method in an access node of a wireless network for performing a mobility management procedure according to one or more embodiments of the disclosure. The access node serves for a wireless device, and there are one or more neighboring access nodes of the serving access node.

At step 710, the serving access node receives a downlink signal quality from each of one or more neighboring access nodes of the access node. The received downlink signal quality of each of one or more neighboring access node is derived at the each of one or more neighboring access nodes according to the method as illustrated in FIG. 2 or 3, for example. More specifically, a downlink signal quality mapping function for each neighboring access node is determined at each neighboring access node, based on which the neighboring access node derives a downlink signal quality from an uplink signal quality decided by itself and then transmits the downlink signal quality to the access node serving for the wireless device for a mobility management decision.

At step 720, the serving access node makes a mobility management decision, based on the received downlink signal qualities from its neighboring nodes and the second downlink signal quality. As illustrated above, the second downlink signal quality of the serving access node is derived based on a downlink signal quality mapping function for the serving access node from an uplink signal quality measured by itself, while the downlink signal qualities of the neighboring access nodes are received from the neighboring access nodes. For example, as for the mobility management decision making, the serving access node may choose a target access node among its neighboring access nodes corresponding to the strongest signal quality from the received downlink signal qualities of the neighboring access nodes and the second downlink signal quality derived by the serving access node.

At step 730, the serving access node performs a mobility management action based on the mobility management decision. For example, the serving access node performs a handover action to switch a wireless connection from the serving access node to the target access node, which is determined in the mobility management decision.

Figure 8:
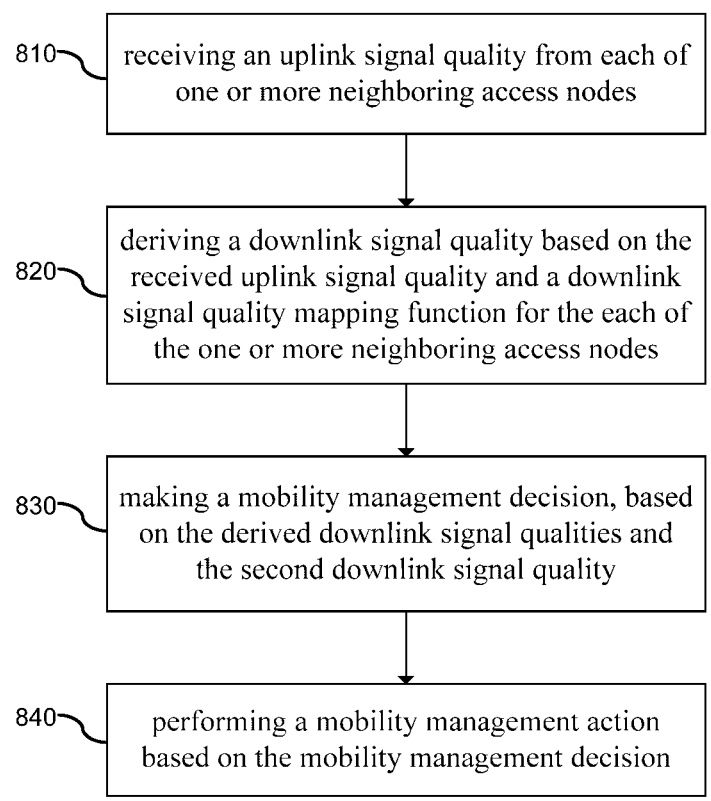
FIG. 8 shows a flowchart for illustrating another method in an access node of a wireless network for performing a mobility management procedure according to one or more embodiments of the disclosure.

FIG. 8 shows a flowchart for illustrating another method in an access node of a wireless network for performing a mobility management procedure according to one or more embodiments of the disclosure. The access node serves for a wireless device, and there are one or more neighboring access nodes for the serving access node.

At step 810, the serving access node receives an uplink signal quality from each of one or more neighboring access nodes. The uplink signal quality of each of one or more neighboring access nodes is obtained at the each of one or more neighboring access nodes through performing an uplink signal quality measurement, and it is transmitted to the serving access node, for example via X2 signaling in LTE system.

At step 820, the serving access node derives a downlink signal quality for each of the one or more neighboring access nodes, based on the received uplink signal quality and a downlink signal quality mapping function of each of the one or more neighboring access node. It should be mentioned that the downlink signal quality mapping function for the each of the one or more neighboring access nodes could be determined at the serving access node as illustrated in FIG. 4 or FIG. 6.

At step 830, the serving access node makes a mobility management decision, based on the derived downlink signal qualities and the second downlink signal quality. For example, as illustrated above, the serving access node may choose a target access node among the neighboring access nodes corresponding to the strongest signal quality from the derived downlink signal qualities of the neighboring access nodes and the second downlink signal quality derived by the serving access node.

At step 840, the serving access node performs a mobility management action based on the mobility management decision. For example, the serving access node performs a handover action to switch a wireless connection from the serving access node to the target access node, which is determined in the mobility management decision at step 830.

In the illustrated methods shown in FIG. 7 and FIG. 8 for mobility management, the decision such as whether to handover and to which access node for handover by the serving access node, is based on comparable downlink signal qualities of candidate access nodes. Despite that the candidate access nodes have different performance and criteria for uplink signal quality measurement which makes the measured uplink signal quality obtained by each of the candidate access nodes might be incomparable, the corresponding downlink signal quality has been calibrated by the corresponding downlink signal quality mapping function and become comparable and reliable. Therefore, the comparison of those derived downlink signal qualities of candidate access nodes is more fair and accurate. Further, the handover decided by the fair comparison would reflect actual need and would lead to less handover failure.

Figure 9:
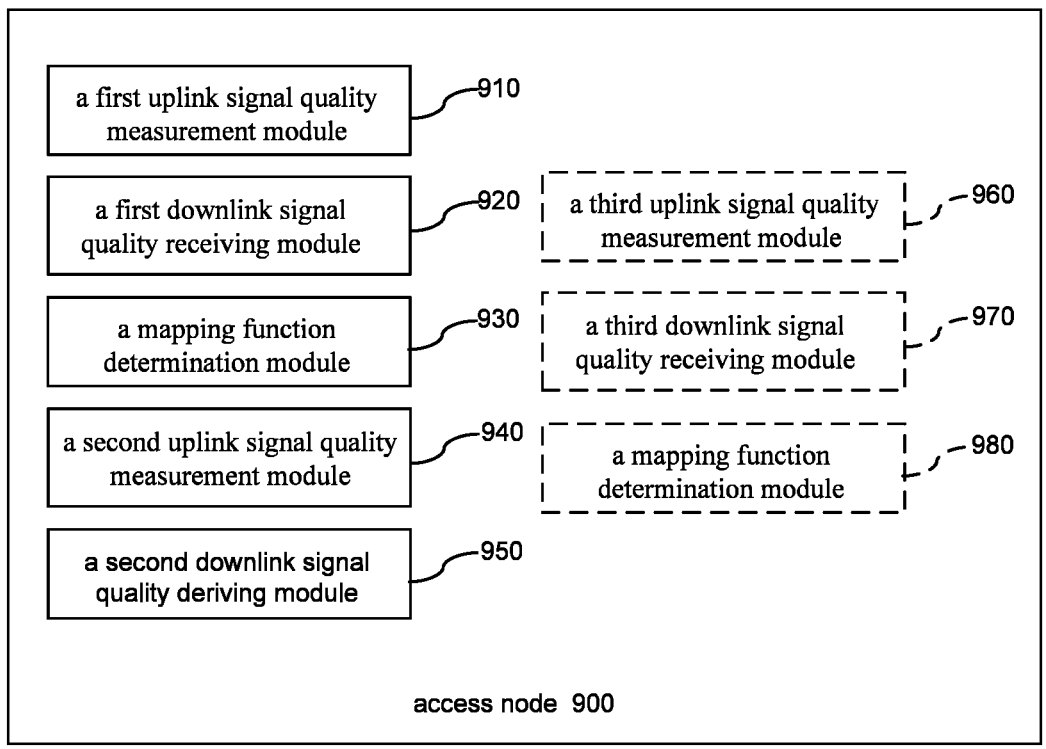
FIG. 9 schematically illustrates a block diagram of an access node according to one or more embodiments of the present invention.

FIG. 9 schematically illustrates a block diagram of an access node according to one or more embodiments of the present invention.

The access node may for example correspond to the access node described in connection with FIG. 2 or FIG. 3. As illustrated, the access node comprises a first uplink signal quality measurement module 910 for performing a first uplink signal quality measurement, and a first downlink signal quality receiving module 920 for receiving a first downlink signal quality, a mapping function determination module 930 for determining a downlink signal quality mapping function based on a first uplink signal quality in the first uplink signal quality measurement and the first downlink signal quality, a second uplink signal quality measurement module 940 for performing a second uplink signal quality measurement and a second downlink signal quality deriving module 950 for deriving a second downlink signal quality based on the downlink signal quality mapping function and a second uplink signal quality in the second uplink signal quality measurement.

The access node may further comprises a third uplink signal quality measurement module 960 for performing a third uplink signal quality measurement, a third downlink signal quality receiving module 970 for receiving a third downlink signal quality and a mapping function determination module 980 for determining the downlink signal quality mapping function based on the first and a third uplink signal qualities and the first and the third downlink signal qualities, thus the mapping function determination module 930 based on the first uplink signal quality measurement module 910 and the first downlink signal quality measurement module 920 is substituted. It should be mentioned that the module 960, 970 and 980 are only preferable modules for the access node. Furthermore, the modules as described above may be implemented through separate modules or using one logic module configured to perform multiple functionalities. For example, the first uplink signal quality measurement module 910 and the third uplink signal quality measurement module 960 may be implemented through two separate modules or preferably a same module configured to perform more than one uplink signal quality measurement such as a first uplink and a third uplink signal quality measurement as mentioned in the corresponding method embodiment.

It should be also mentioned the above modules correspond to the steps of the method described above, and it is appreciated for the person skilled in the art that the aforementioned modules could be implemented via Programmable Logic Device (PLD), Field Programmable Gate Array (FPGA), Application Specific Integrated Circuit (ASIC), and other implement mechanisms as software products, application specific firmware, hardware products and a combination thereof.

Figure 10:
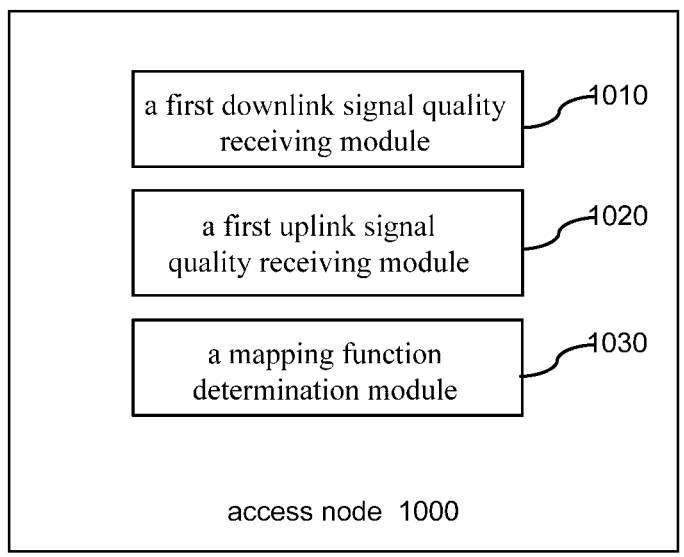
FIG. 10 schematically illustrates a block diagram of an access node according to one or more embodiments of the present invention.

FIG. 10 schematically illustrates a block diagram of an access node according to one or more embodiments of the present invention.

The access node may for example correspond to the access node described in connection with FIG. 4. As illustrated, the access node comprises a first downlink signal quality receiving module 1010 for receiving a first downlink signal quality of a neighboring access node of the access node, a first uplink signal quality receiving module 1020 for receiving a first uplink signal quality of the neighboring access node and a mapping function determination module 1030 for determining a downlink signal quality mapping function for the neighboring access node, based on the received first downlink signal quality and the received first uplink signal quality.

It should be also mentioned the above modules correspond to the steps of the method described above, and it is appreciated for the person skilled in the art that the aforementioned modules could be implemented via PLD, FPGA, ASIC, and other implement mechanisms as software products, application specific firmware, hardware products and a combination thereof.

Figure 11:
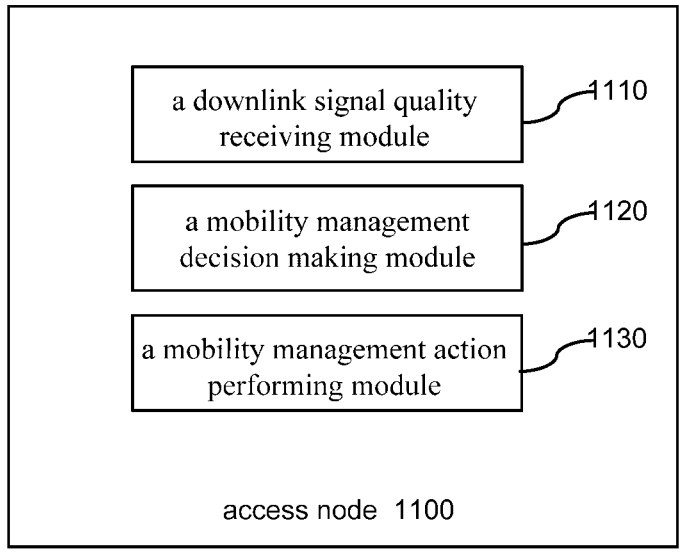
FIG. 11 schematically illustrates a block diagram of an access node according to one or more embodiments of the present invention.

FIG. 11 schematically illustrates a block diagram of an access node according to one or more embodiments of the present invention.

The access node may for example correspond to the access node described in connection with FIG. 7. As illustrated, the access node comprises a downlink signal quality receiving module 1110 for receiving a downlink signal quality from each of one or more neighboring access nodes of the access node, the received downlink signal quality of each of one or more neighboring access node being derived at the each of one or more neighboring access nodes, a mobility management decision making module 1120 for making a mobility management decision, based on the received downlink signal qualities and the second downlink signal quality and a mobility management action performing module 1130 for performing a mobility management action based on the mobility management decision.

It should be also mentioned the above modules correspond to the steps of the method described above, and it is appreciated for the person skilled in the art that the aforementioned modules could be implemented via PLD, FPGA, ASIC, and other implement mechanisms as software products, application specific firmware, hardware products and a combination thereof.

Figure 12:
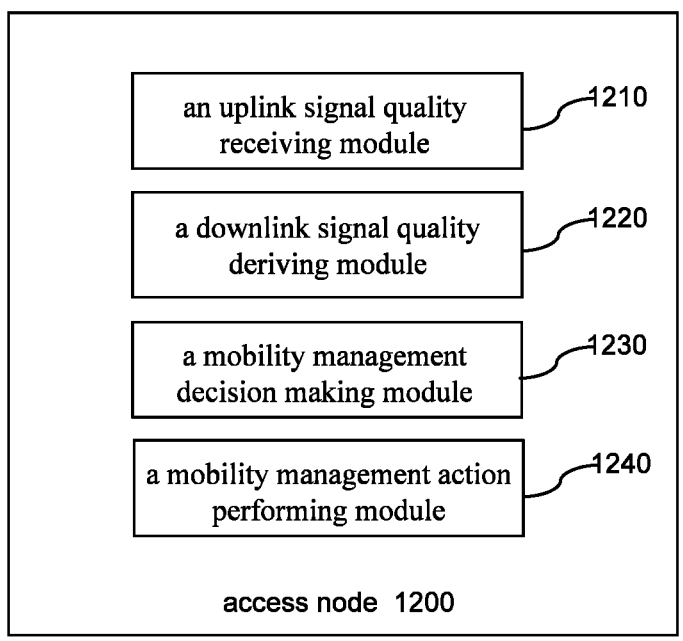
FIG. 12 schematically illustrates a block diagram of an access node according to one or more embodiments of the present invention.

FIG. 12 schematically illustrates a block diagram of an access node according to one or more embodiments of the present invention.

The access node may for example correspond to the access node described in connection with FIG. 8. As illustrated, the access node comprises an uplink signal quality receiving module 1210 for receiving an uplink signal quality from each of one or more neighboring access nodes, a downlink signal quality deriving module 1220 for deriving a downlink signal quality based on the received uplink signal quality and a downlink signal quality mapping function for the each of the one or more neighboring access nodes, a mobility management decision making module 1230 for making a mobility management decision, based on the derived downlink signal qualities and the second downlink signal quality and a mobility management action performing module 1240 for performing a mobility management action based on the mobility management decision.

It should be also mentioned the above modules correspond to the steps of the method described above, and it is appreciated for the person skilled in the art that the aforementioned modules could be implemented via PLD, FPGA, ASIC, and other implement mechanisms as software products, application specific firmware, hardware products and a combination thereof.

Figure 13:
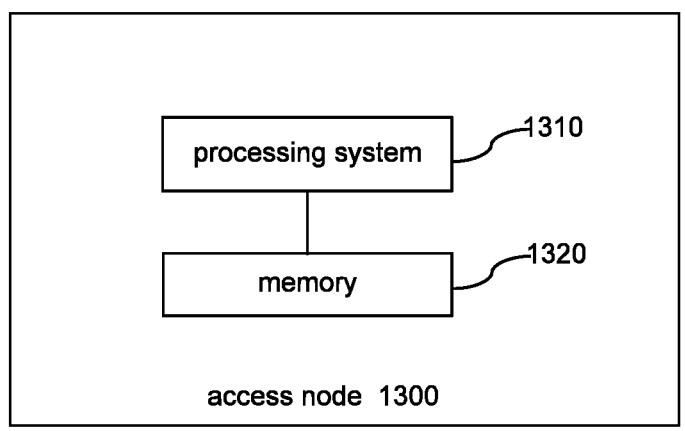
FIG. 13 schematically illustrates a block diagram of an access node according to one or more embodiments of the present invention.

FIG. 13 schematically illustrates a block diagram of an access node according to one or more embodiments of the present invention.

The access node may for example correspond to the access node described in connection with FIG. 2-8. The access node comprises a memory 1320 storing instructions and a processing system 1310 configured to execute the instructions performing the steps of the method illustrated in FIG. 2-8. For example, the processing system which includes one or more microprocessor or microcontrollers, as well as other digital hardware, which may include Digital Signal Processors (DSP), special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory includes suitably configured program code to be executed by the processing system so as to implement the above-described functionalities of the access node. In particular, the memory may include various program code modules for causing the primary access node to perform processes as described above, e.g., corresponding to the method steps of any one of FIG. 2-8. The access node may also comprise at least one interface (not shown) for communicating with the wireless device, e.g. a wireless interface, and/or for communicating with the neighboring access nodes, e.g. a wired or wireless interface. The interface could be coupled to the processing system. Information and data as described above in connection with the methods may be sent via the interface.

In general, the various exemplary embodiments may be implemented in hardware or special purpose circuits, software, logical or any combination thereof. For example, some aspects may be implemented in m hardware, while other aspects may be implemented in firmware or software which may be executed by a controller, microprocessor or other computing devices, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system. The present disclosure has been specifically illustrated and explained with reference to the preferred embodiments. The skilled in the art should understand various changes thereto in form and details may be made without departing from the spirit and scope of the present disclosure.

The invention claimed is:

1. A method in an access node of a wireless network, the method comprising:
   performing a first uplink signal quality measurement based on one or more first uplink reference signals transmitted from a wireless device;
   receiving a first downlink signal quality from the wireless device;

determining a downlink signal quality mapping function based on a relationship between the first uplink signal quality measurement and the first downlink signal quality;

performing a second uplink signal quality measurement based on one or more second uplink reference signals transmitted from a wireless device, wherein the second uplink reference signals are received by the access node after the first uplink reference signals;

deriving a second downlink signal quality based on the downlink signal quality mapping function and the second uplink signal quality measurement; and performing a mobility management action based at least in part on the derived second downlink signal quality.

2. The method according to claim 1, the method further comprising:

performing a third uplink signal quality measurement; and receiving a third downlink signal quality; and wherein determining the downlink signal quality mapping function is further based on the relationship between the third uplink signal quality measurement and the third downlink signal quality.

3. The method according to claim 1, wherein the downlink signal quality mapping function is a linear function with a calibration offset.

4. The method according to claim 1, the method further comprising:

receiving a first downlink signal quality of a neighboring access node of the access node;

receiving a first uplink signal quality of the neighboring access node; and determining a downlink signal quality mapping function for the neighboring access node, based on the received first downlink signal quality and the received first uplink signal quality.

5. The method according to claim 1, wherein the downlink signal quality mapping function is updated periodically or in response to one or more predefined events.

6. The method according to claim 1, the access node serving for a wireless device, the method further comprising:

receiving a downlink signal quality from each of one or more neighboring access nodes of the access node, wherein the received downlink signal quality of each of one or more neighboring access node is derived at the each of one or more neighboring access nodes; and making a mobility management decision, based on the received downlink signal qualities and the second downlink signal quality;

wherein performing the mobility management action is further based on the mobility management decision.

7. The method according to claim 1, the access node serving for a wireless device, the method further comprising:

receiving an uplink signal quality from each of one or more neighboring access nodes;

deriving a downlink signal quality based on the received uplink signal quality and a downlink signal quality mapping function for the each of the one or more neighboring access nodes; and making a mobility management decision, based on the derived downlink signal qualities and the second downlink signal quality; and wherein performing the mobility management action is further based on the mobility management decision.

8. A computer readable non-transitory storage medium, which store instructions which, when run on a processing system of an access node for a wireless network, cause the access node to:

perform a first uplink signal quality measurement based on one or more first uplink reference signals transmitted from a wireless device;

receive a first downlink signal quality from the wireless device;

determine a downlink signal quality mapping function based on a relationship between the first uplink signal quality measurement and the first downlink signal quality;

perform a second uplink signal quality measurement based on one or more second uplink reference signals transmitted from a wireless device, wherein the second uplink reference signals are received by the access node after the first uplink reference signals;

derive a second downlink signal quality based on the downlink signal quality mapping function and the second uplink signal quality measurement; and perform a mobility management action based at least in part on the derived second downlink signal quality.

9. An access node in a wireless network, comprising:

a processing system, and a memory including instructions which, when executed by the processing system, cause the access node to:

perform a first uplink signal quality measurement based on one or more first uplink reference signals transmitted from a wireless device;

receive a first downlink signal quality from the wireless device;

determine a downlink signal quality mapping function based on a relationship between the first uplink signal quality measurement and the first downlink signal quality;

perform a second uplink signal quality measurement based on one or more second uplink reference signals transmitted from a wireless device, wherein the second uplink reference signals are received by the access node after the first uplink reference signals;

derive a second downlink signal quality based on the downlink signal quality mapping function and the second uplink signal quality measurement; and perform a mobility management action based at least in part on the derived second downlink signal quality.

10. The access node according to claim 9, wherein the access node serving for a wireless device, the memory includes instructions which, when executed by the processing system, cause the access node to:

receive an uplink signal quality from each of one or more neighboring access nodes;

derive a downlink signal quality based on the received uplink signal quality and a downlink signal quality mapping function for the each of the one or more neighboring access nodes; and make a mobility management decision, based on the derived downlink signal qualities and the second downlink signal quality;

wherein performing the mobility management action is further based on the mobility management decision.

11. The access node according to claim 9, wherein the memory further includes instructions which, when executed by the processing system, cause the access node to:

perform a third uplink signal quality measurement; and receive a third downlink signal quality; and wherein determining the downlink signal quality mapping function is further based on the relationship between the third uplink signal quality measurement and the third downlink signal quality.

12. The access node according to claim 9, wherein the downlink signal quality mapping function is a linear function with a calibration offset.

13. The access node according to claim 9, wherein the memory further includes instructions which, when executed by the processing system, cause the access node to:
receive a first downlink signal quality of a neighboring access node of the access node;
receive a first uplink signal quality of the neighboring access node; and
determine a downlink signal quality mapping function for the neighboring access node, based on the received first downlink signal quality and the received first uplink signal quality.

14. The access node according to claim 9, wherein the downlink signal quality mapping function is updated periodically or in response to one or more predefined events.

15. The access node according to claim 9, wherein the access node serving for a wireless device, the memory includes instructions which, when executed by the processing system, cause the access node to:
receive a downlink signal quality from each of one or more neighboring access nodes of the access node, wherein the received downlink signal quality of each of one or more neighboring access node is derived at the each of one or more neighboring access nodes; and
make a mobility management decision, based on the received downlink signal qualities and the second downlink signal quality;
wherein performing the mobility management action is further based on the mobility management decision.

16. The access node according to claim 11, wherein the access node serving for a wireless device, the memory includes instructions which, when executed by the processing system, cause the access node to:
receive an uplink signal quality from each of one or more neighboring access nodes;
derive a downlink signal quality based on the received uplink signal quality and a downlink signal quality mapping function for the each of the one or more neighboring access nodes; and
make a mobility management decision, based on the derived downlink signal qualities and a second downlink signal quality;
wherein performing the mobility management action is further based on the mobility management decision.

17. The access node according to claim 11, wherein the memory further includes instructions which, when executed by the processing system, cause the access node to:
receive a first downlink signal quality of a neighboring access node of the access node;
receive a first uplink signal quality of the neighboring access node; and
determine a downlink signal quality mapping function for the neighboring access node, based on the received first downlink signal quality and the received first uplink signal quality.

18. The access node according to claim 11, wherein the access node serving for a wireless device, the memory includes instructions which, when executed by the processing system, cause the access node to:
receive a downlink signal quality from each of one or more neighboring access nodes of the access node, wherein the received downlink signal quality of each of one or more neighboring access node is derived at the each of one or more neighboring access nodes; and
make a mobility management decision, based on the received downlink signal qualities and the second downlink signal quality;
wherein performing the mobility management action is further based on the mobility management decision.

* * * * *